US008524369B2

(12) United States Patent
Irikura et al.

(10) Patent No.: US 8,524,369 B2
(45) Date of Patent: Sep. 3, 2013

(54) METHOD FOR LAMINATION OF DECORATIVE METAL FILM ON RESIN BASE MATERIAL, AND RESIN BASE MATERIAL HAVING DECORATIVE METAL FILM THEREON

(75) Inventors: Hagane Irikura, Ibaraki (JP); Daisuke Omori, Ibaraki (JP); Kaori Motegi, Ibaraki (JP); Ken Momono, Kanagawa (JP); Yusuke Hashimoto, Kanagawa (JP)

(73) Assignee: Ulvac, Inc., Chigasaki-shi (JP)

( * ) Notice: Subject to any disclaimer, the term of this patent is extended or adjusted under 35 U.S.C. 154(b) by 467 days.

(21) Appl. No.: 12/681,970

(22) PCT Filed: Oct. 17, 2008

(86) PCT No.: PCT/JP2008/068844
§ 371 (c)(1),
(2), (4) Date: Apr. 19, 2010

(87) PCT Pub. No.: WO2009/051218
PCT Pub. Date: Apr. 23, 2009

(65) Prior Publication Data

US 2010/0209721 A1 Aug. 19, 2010

(30) Foreign Application Priority Data

Oct. 18, 2007 (JP) ................................ 2007-270849

(51) Int. Cl.
*B32B 27/42* (2006.01)
*B32B 37/10* (2006.01)
*C09J 7/00* (2006.01)

(52) U.S. Cl.
USPC .................... 428/425.8; 428/425.9; 156/285; 156/313

(58) Field of Classification Search
USPC .................. 428/457, 425.8, 425.9; 156/285, 156/313
See application file for complete search history.

(56) References Cited

U.S. PATENT DOCUMENTS

| | | | | |
|---|---|---|---|---|
| 4,624,867 | A | 11/1986 | Iijima et al. | |
| 4,908,276 | A | 3/1990 | Yamamoto | |
| 5,505,808 | A | 4/1996 | Hallman et al. | 156/233 |
| 8,072,138 | B2 * | 12/2011 | Masuda et al. | 313/512 |
| 2010/0026166 | A1 | 2/2010 | Takahashi | |

FOREIGN PATENT DOCUMENTS

| | | | |
|---|---|---|---|
| CN | 1184514 | A | 6/1998 |
| DE | 198 47 278 | A1 | 4/2000 |
| DE | 10 2004 049 111 | A1 | 4/2006 |

(Continued)

OTHER PUBLICATIONS

Korean Office Action dated May 4, 2012, in counterpart Korean Application 10-2010-7005797.

(Continued)

*Primary Examiner* — Thao T. Tran
(74) *Attorney, Agent, or Firm* — Kratz, Quintos & Hanson, LLP.

(57) ABSTRACT

The present invention provides a method for laminating a decorative metal film on a resin base material with excellent adhesion to the resin base material and with a sufficient gloss imparted to the decorative metal film, and a resin base material having a decorative metal film. The method laminates a polymeric planarizing film on the resin base material using a vapor deposition polymerization method, and then laminates the decorative metal film on the planarizing film.

4 Claims, 1 Drawing Sheet

(56) References Cited

FOREIGN PATENT DOCUMENTS

| | | | |
|---|---|---|---|
| EP | 0 151 985 | A2 | 1/1985 |
| EP | 2 135 971 | A1 | 12/2009 |
| JP | 60-162201 | | 8/1985 |
| JP | 61-78463 | | 4/1986 |
| JP | 3-97849 | | 4/1991 |
| JP | 2003-25480 | | 1/2003 |
| JP | 2006-199991 | A1 | 8/2006 |
| JP | 2007-134099 | A1 | 5/2007 |
| KR | 1985-0006055 | | 9/1985 |
| WO | WO 96/31649 | | 10/1996 |
| WO | WO 2005122644 | A1 * | 12/2005 |
| WO | WO 2008/129925 | A1 | 10/2008 |

OTHER PUBLICATIONS

International Search Report for International Application No. PCT/JP2008/068844 dated Jan. 13, 2009.

Annex to the European Search Report in counterpart EP Application No. 08838832.7.

Chinese Office Action dated Jul. 19, 2012, in counterpart Chinese Application No. 200880107592 (6 pages).

* cited by examiner

METHOD FOR LAMINATION OF DECORATIVE METAL FILM ON RESIN BASE MATERIAL, AND RESIN BASE MATERIAL HAVING DECORATIVE METAL FILM THEREON

TECHNICAL FIELD

The present invention relates to a method for laminating a decorative metal film on a resin base material, and a resin base material having a decorative metal film thereon.

BACKGROUND ART

For the lamination of a decorative metal film, the resin base materials used in applications such as in electronic devices, home appliances, and exteriors and interiors of automobiles are subjected to a surface treatment whereby a thin film of about 10 μm thick is laminated using methods such as a coating method, and a decorative metal film is laminated thereon to provide the feel and appearance of a metal, using a wet plating method, a sputtering method, or a vacuum deposition method.

One of the problems of the coating method, however, is that it uses organic solvents and is therefore harmful to the environment. Another problem is the cost and the poor yield. Further, the coating method presents difficulties in continuously performing processes such as sputtering after the surface treatment, preventing the reduction of the installation area of the deposition apparatus.

DISCLOSURE OF THE INVENTION

Problems that the Invention is to Solve

It is accordingly an object of the present invention to provide a method for laminating a decorative metal film on a resin base material with excellent adhesion to the resin base material and with a sufficient gloss imparted to the decorative metal film, and a resin base material having a decorative metal film.

Means for Solving the Problems

In order to solve the foregoing problems, the inventors of the present invention conducted intensive studies and found the means for resolution, as follows.

Specifically, a method for laminating a planarizing film on a resin base material according to the first aspect of the present invention is a method for laminating a planarizing film on a resin base material, whereby a polymeric planarizing film is laminated on the resin base material using a vapor deposition polymerization method, and then the decorative metal film is laminated on the planarizing film.

According to the second aspect of the invention, the method for laminating a planarizing film on a resin base material according to the first aspect of the invention is a method in which the polymer is a polyurea.

According to the third aspect of the invention, the method for laminating a planarizing film on a resin base material according to the first aspect of the invention is a method in which the planarizing film is laminated at a deposition rate of 0.5 μm/min or more, and has a thickness of 1 μm to 100 μm.

According to the fourth aspect of the invention, there is provided a resin base material including a decorative metal film, wherein the decorative metal film is laminated via a polymeric planarizing film formed on the resin base material using a vapor deposition polymerization method.

According to the fifth aspect of the invention, the resin base material including a decorative metal film according to the fourth aspect of the invention is a resin base material in which the planarizing film is made of polyurea.

According to the sixth aspect of the invention, the resin base material including a decorative metal film according to the fourth aspect of the invention is a resin base material in which the planarizing film has a thickness of 1 μm to 100 μm, and in which the decorative metal film has a thickness of 10 nm to 100 nm.

Advantage of the Invention

The present invention enables lamination of a highly adherent planarizing film in a significantly reduced thickness on a surface of a resin base material having microscopic surface irregularities. The invention also enables a sufficient gloss to be imparted to the decorative metal film formed on the planarizing film.

BEST MODE FOR CARRYING OUT THE INVENTION

An embodiment of the present invention is described below.

DESCRIPTION OF REFERENCE NUMERALS AND SIGNS

Figure 1:
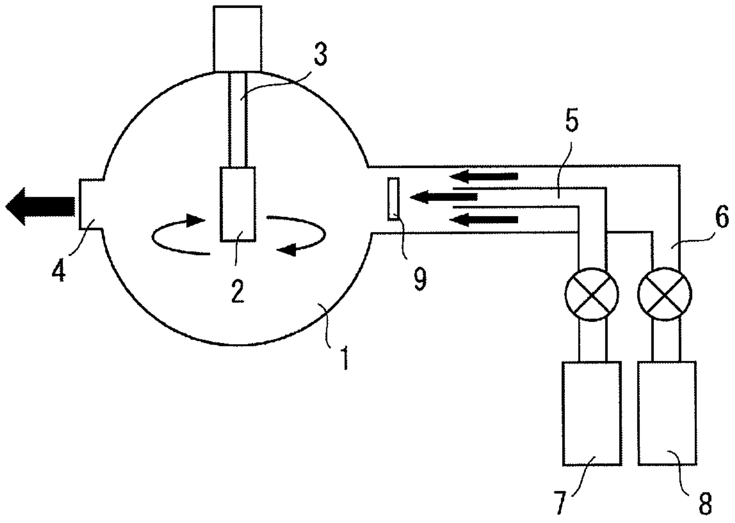
FIG. 1 is an explanatory diagram illustrating a structure of an apparatus used in an example of the present invention.

1 Processing chamber
2 Resin base material
3 Holder
4 Vacuum exhaust system
5 Channel
6 Channel
7 Container
8 Container
9 Valve
10 Polyurea film
11 Decorative metal film
12 Protective film (polyurea film)

In a method for laminating a decorative metal film of the present invention, a polymeric planarizing film is first laminated on a resin base material using a vapor deposition polymerization method.

The deposition rate of the polymeric planarizing film is not particularly limited, and is preferably 0.5 μm/min or more.

The material of the polymeric planarizing film is not particularly limited, as long as it can be deposited by vapor deposition polymerization. Examples of such materials include polyurea, polyimide, polyamide, polyoxadiazole, polyurethane, and polyazomethine. Of these, polyurea is preferable for its superior property to protect the resin base material.

The polyurea can be obtained by the vapor deposition polymerization of an aromatic alkyl, alicyclic, or aliphatic diisocyanate monomer, and an aromatic alkyl, alicyclic, or aliphatic diamine monomer.

The feedstock monomer diisocyanate may be, for example, the aromatic alkyl diisocyanate represented by chemical formula 1, the alicyclic diisocyanate represented by chemical formula 2, or the aliphatic diisocyanate represented by chemical formula 3.

[Chemical Formula 1]

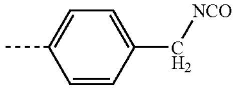

[Chemical Formula 2]

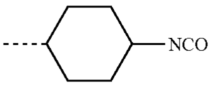

[Chemical Formula 3]

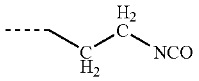

The feedstock monomer diamine may be, for example, the aromatic alkyl diamine represented by chemical formula 4, the alicyclic diamine represented by chemical formula 5, or the aliphatic diamine represented by chemical formula 6.

[Chemical Formula 4]

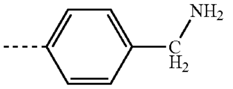

[Chemical Formula 5]

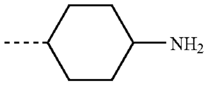

[Chemical Formula 6]

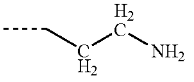

The planarizing film of polyurea can be obtained by evaporating these feedstock monomers in a vacuum, and polymerizing the monomers on a resin base material. The vacuum pressure is not particularly limited, and may be about $10^{-3}$ to 100 Pa.

Specific examples of the feedstock monomers are as follows.

<Diisocyanate>

Aromatic alkyl: 1,3-bis(isocyanatemethyl)benzene, 1,3-bis(1-isocyanate-1-methylethyl)benzene or the like Alicyclic: 1,3-bis(isocyanatemethyl)cyclohexane, 3-isocyanatemethyl-3,5,5-trimethylhexylisocyanate, methylenebis(4-cyclohexylisocyanate), 2,5(2,6)-bis(isocyanatemethyl)bicyclo[2,2,1]heptane or the like Aliphatic: 1,6-diisocyanatehexane, 1,5-diisocyanate-2-methylpentane, 1,8-diisocyanateoctane, 1,12-diisocyanatedodecane, tetraisocyanatesilane, monomethyltriisocyanatesilane or the like.

<Diamine>

Aromatic alkyl: 1,3-bis(aminomethyl)benzene, 1,4-bis(aminomethyl)benzene, isophthalic acid dihydrazide or the like Alicyclic: 1,3-bis(aminomethyl)cyclohexane, 1,4-bis(aminomethyl)cyclohexane, 3-aminomethyl-3,5,5-trimethylhexylamine, 1,2-diaminecyclohexane, 1,4-diaminocyclohexane, methylenebis(4-cyclohexylamine), piperazine, 2-piperazine, 2,5-dimethylpiperazine, 2,6-dimethylpiperazine, N,N'-bis(3-aminopropyl)piperazine, 1,3-di(4-piperidyl)propane, hydantoin, hexahydro-1H-1,4-diazepine, barbituric acid or the like Aliphatic: 1,6-diaminohexane, 1,7-diaminoheptane, 1,8-diaminooctane, 1,9-diaminononane, 1,10-diaminodecane, 1,12-diaminododecane, bis(2-aminoethyl)amine, bis(3-aminopropyl)amine, N,N'-bis(aminopropyl)methylamine, N-(3-aminopropyl)-1,4-butanediamine, N,N'-(3-aminopropyl)-1,4-butanediamine, adipic acid dihydrazide, dodecanedioic acid dihydrazide, sebacic acid dihydrazide or the like The thickness of the polymeric planarizing film is preferably 1 µm to 100 µm, since a thickness below 1 µm presents a problem in planarization, whereas a thickness above 100 µm increases a film stress.

A decorative metal film is then laminated on the resin base material provided with the polymeric planarizing film as above, using methods such as a sputtering method, a vacuum deposition method, and an ion plating method.

The thickness of the decorative metal film is not particularly limited, and is preferably 10 nm to 100 nm, since a thickness below 10 nm fails to give a metallic gloss, whereas a thickness above 100 nm increases a film stress.

The material of the decorative metal film is not particularly limited either. For example, Cr, Al, and SUS can be used.

The decorative metal film may be protected by coating the decorative metal film with a protective film using an organic solvent, or by laminating a polymeric film using a vapor deposition polymerization method. Specific examples of the material usable for the protective film include polyurea, acryl, urethane, and acrylic urethane. The thickness of the protective film may be, for example, 10 µm to 50 µm. Examples of the organic solvent include alcohol- and acetone-based solvents.

In the manner described above, a highly adherent planarizing film can be laminated on a surface of the resin base material in a significantly reduced thickness. Further, a sufficient gloss can be imparted to the decorative metal film laminated on the planarizing film.

The resin base material used in the present invention is not particularly limited, as long as it is a resin. For example, ABS (acrylonitrile butadiene styrene), PC (polycarbonate), and PBT (polybutylene terephthalate) can be used. Further, the resin base material is not particularly limited to a planar shape, and may have a complex three-dimensional shape.

Generally, microscopic surface irregularities (Ra=100 nm to 1,000 nm) are left on the surface of the resin base material, depending on the molding method employed. With the present invention, such microscopic surface irregularities can be planarized with the highly adherent thin film.

EXAMPLES

An example of the present invention is described below with reference to the accompanying drawings.

FIG. 1 illustrates an example of an apparatus used in a method of the present invention. As illustrated in FIG. 1, a PC resin base material 2 as the base material of a polyurea film was rotatably supported on a holder 3 in a processing chamber 1. The processing chamber 1 was connected to glass containers 7 and 8 containing the feedstock monomers, via a vacuum exhaust system 4 or some other external vacuum pump, and channels 5 and 6. As the feedstock monomers, methylenebis(4-cyclohexylamine) and 1,3-bis(isocyanatemethyl)cyclohexane were used. As illustrated in FIG. 1, a valve 9 was provided between the PC resin base material 2 and the evaporation containers 7 and 8.

Figure 2:
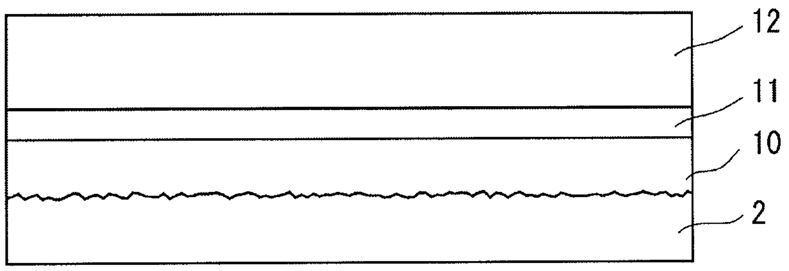
FIG. 2 is an explanatory diagram illustrating a lamination of a resin base material of an example of the present invention.

In the apparatus of the foregoing configuration, the methylenebis(4-cyclohexylamine) in the glass container 7, and the 1,3-bis(isocyanatemethyl)cyclohexane in the glass container 8 were heated to 94° C. and 86° C., respectively. The pressure in the processing chamber 1 was adjusted to 1 Pa with the vacuum exhaust system 4, and the temperature inside the chamber was set to 20° C. to adjust the PC resin base material 2 at the same temperature. The feedstock monomers were then introduced into the processing chamber 1 and allowed to react with each other by the vapor deposition polymerization reaction represented by the chemical formula 7 below. As a result, as illustrated in FIG. 2, a planarizing film 10 of polyurea, 10 µm thick, was laminated on the resin base material 2 (Ra=100) formed by injection molding. The deposition rate was 0.5 µm/min. The pressure inside the processing chamber 1 after the introduction of the feedstock monomers was 5 Pa.

Then, a decorative metal film 11 of Cr was laminated on the planarizing film 10 by sputtering in a thickness of 0.1 µm. On the decorative metal film 11, a polyurea film having a thickness of 10 µm was laminated as a protective film 12.

[Chemical Formula 7]

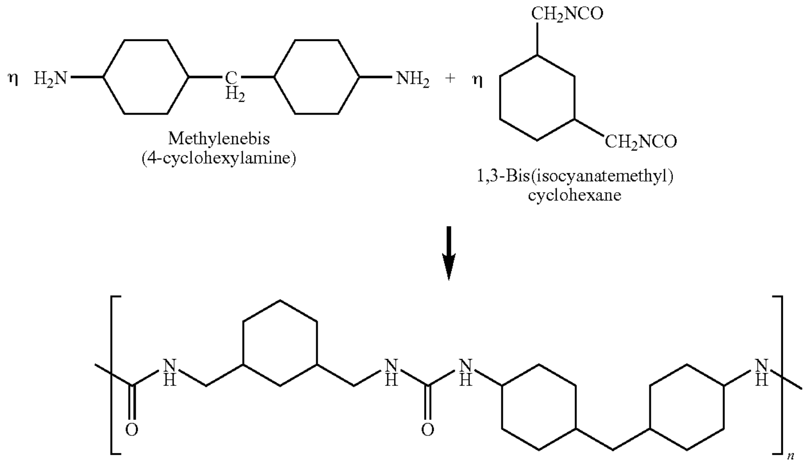

Methylenebis (4-cyclohexylamine)

1,3-Bis(isocyanatemethyl) cyclohexane

The planarizing film 10 was highly adherent to the resin base material 2 despite the extremely thin thickness of 10 μm. Further, the decorative metal film 11 laminated on the planarizing film 10 had an excellent metallic gloss.

INDUSTRIAL APPLICABILITY

The present invention is applicable to resin base materials in a wide range of applications, including electronic devices (for example, the exterior of mobile phones), home appliances (for example, the knob of the refrigerator), the exterior of automobiles (for example, the front grille), and interior parts (for example, the center console).

The invention claimed is:

1. A method for laminating a decorative metal film on a resin base material, the method comprising laminating a planarizing film made of polyurea on the resin base material using a vapor deposition polymerization method, and laminating the decorative metal film on the planarizing film.

2. The method according to claim 1, wherein the laminating of the planarizing film comprises depositing the planarizing film at a deposition rate of 0.5 μm/min or more, to a thickness of 1 μm to 100 μm.

3. A material having a decorative metal film, which is made by:

laminating a polymeric planarizing film on a resin base material using a vapor deposition polymerization method, and then laminating a decorative metal film on the planarizing film.

4. The material having a decorative metal film according to claim 3, wherein the planarizing film has a thickness of 1 μm to 100 μm, and the decorative metal film has a thickness of 10 nm to 100 nm.

* * * * *